(12) United States Patent
Goebel et al.

(10) Patent No.: US 7,713,644 B2
(45) Date of Patent: *May 11, 2010

(54) CATALYST LAYER EDGE PROTECTION FOR ENHANCED MEA DURABILITY IN PEM FUEL CELLS

(75) Inventors: Steven Goebel, Victor, NY (US); Hubert A. Gasteiger, Rochester, NY (US); Bhaskar Sompalli, Rochester, NY (US); Brian A. Litteer, Henrietta, NY (US)

(73) Assignee: GM Global Technology Operations, Inc.

( * ) Notice: Subject to any disclaimer, the term of this patent is extended or adjusted under 35 U.S.C. 154(b) by 1684 days.

This patent is subject to a terminal disclaimer.

(21) Appl. No.: 10/903,912

(22) Filed: Jul. 30, 2004

(65) Prior Publication Data

US 2005/0058881 A1 Mar. 17, 2005

Related U.S. Application Data

(63) Continuation-in-part of application No. 10/266,965, filed on Oct. 8, 2002, now Pat. No. 6,861,173.

(51) Int. Cl.
*H01M 4/86* (2006.01)
(52) U.S. Cl. .......................... 429/34; 429/40
(58) Field of Classification Search ............ 429/40, 429/44, 30, 34, 36, 38, 209; 427/115; 502/101; 156/289, 234
See application file for complete search history.

(56) References Cited

U.S. PATENT DOCUMENTS

| | | | |
|---|---|---|---|
| 3,134,697 A | 5/1964 | Niedrach | |
| 5,272,017 A | 12/1993 | Swathirajan | |
| 5,464,700 A | 11/1995 | Steck | |
| 5,858,569 A * | 1/1999 | Meacher et al. | ........ 429/26 |
| 6,020,083 A | 2/2000 | Breault | |
| 6,054,010 A * | 4/2000 | Tanaka et al. | ........ 156/289 |
| 6,099,984 A | 8/2000 | Rock | |
| 6,127,058 A | 10/2000 | Pratt | |
| 6,234,225 B1 | 5/2001 | Tanaka | |
| 6,350,538 B1 | 2/2002 | Wilkinson | |
| 6,861,173 B2 * | 3/2005 | Bhaskar et al. | ........ 429/40 |
| 2003/0049518 A1 | 3/2003 | Nanaumi | |

FOREIGN PATENT DOCUMENTS

WO    WO 00/10216    2/2000

* cited by examiner

*Primary Examiner*—Patrick Ryan
*Assistant Examiner*—Monique Wills
(74) *Attorney, Agent, or Firm*—Harness, Dickey & Pierce, P.L.C.

(57) ABSTRACT

A membrane electrode assembly comprising an ionically conductive member and an electrode, wherein the electrode is a smooth, continuous layer that completely covers and supports the ionically conductive member. The electrode further comprises a central region and a peripheral region, wherein a gradient of electrochemically active material exists between the central region and the peripheral region such that a content of the electrochemically active material is greater in the central region than the peripheral region.

65 Claims, 6 Drawing Sheets

Comparison of durability of MEA architectures (Standard vs. Edge-protected).

CATALYST LAYER EDGE PROTECTION FOR ENHANCED MEA DURABILITY IN PEM FUEL CELLS

CROSS-REFERENCE TO RELATED APPLICATIONS

This application is a continuation-in-part application of U.S. patent application Ser. No. 10/266,965 filed on Oct. 8, 2002. The disclosure of the above application is incorporated herein by reference in its entirety.

FIELD OF THE INVENTION

The present invention relates to fuel cells and, more particularly, to a membrane electrode assemblies for a fuel cell.

BACKGROUND OF THE INVENTION

Fuel cells have been proposed as a power source for electric vehicles and other applications. One such fuel cell is the PEM (i.e. Proton Exchange Membrane) fuel cell that includes a so-called "membrane-electrode-assembly" (MEA) comprising a thin, solid polymer membrane-electrolyte having a pair of electrodes (i.e., an anode and a cathode) on opposite faces of the membrane-electrolyte. The MEA is sandwiched between planar gas distribution elements.

The electrodes are typically of a smaller surface area as compared to the membrane electrolyte such that edges of the membrane electrolyte protrude outward from the electrodes. On these edges of the membrane electrolyte, gaskets or seals are disposed to peripherally frame the electrodes. Due to the limitations of manufacturing tolerances, the seals, MEA, and gas distribution elements are not adequately closely aligned.

Further, due to the limitations of manufacturing tolerances, a flux of reactants can cross the solid polymer electrolyte from one electrode to the other electrode.

SUMMARY OF THE INVENTION

The present invention provides a membrane electrode assembly comprising an ionically conductive member and an electrode, wherein the electrode is a relatively smooth, continuous layer that essentially completely covers and supports the ionically conductive member. The electrode includes a central region and a peripheral region, wherein a gradient of electrochemically active material exists between the central region and the peripheral region, such that a content of the electrochemically active material is greater in the central region than the peripheral region. In one embodiment, the active region comprises polymeric ionomer and catalyzed carbon particles; and the peripheral region comprises an ionomer and uncatalyzed carbon particles. In another embodiment, the active region comprises polymeric ionomer and catalyzed carbon particles; and the peripheral region comprises an ionically non-conductive binder and catalyzed electrically non-conductive particles.

In a preferred method of manufacture, a first ink containing the active region constituents is deposited on a membrane and then a second ink containing the peripheral region constituents is deposited before the first ink cures or dries. Thus, an intermediate region is formed having a catalyst content between that of the active and peripheral regions, as the inks intermingle or particles migrate there between. As can be seen, the electrode layer so formed is continuous over the face of the membrane. Thus, stresses engineered by prior art seals or gaskets are obviated.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
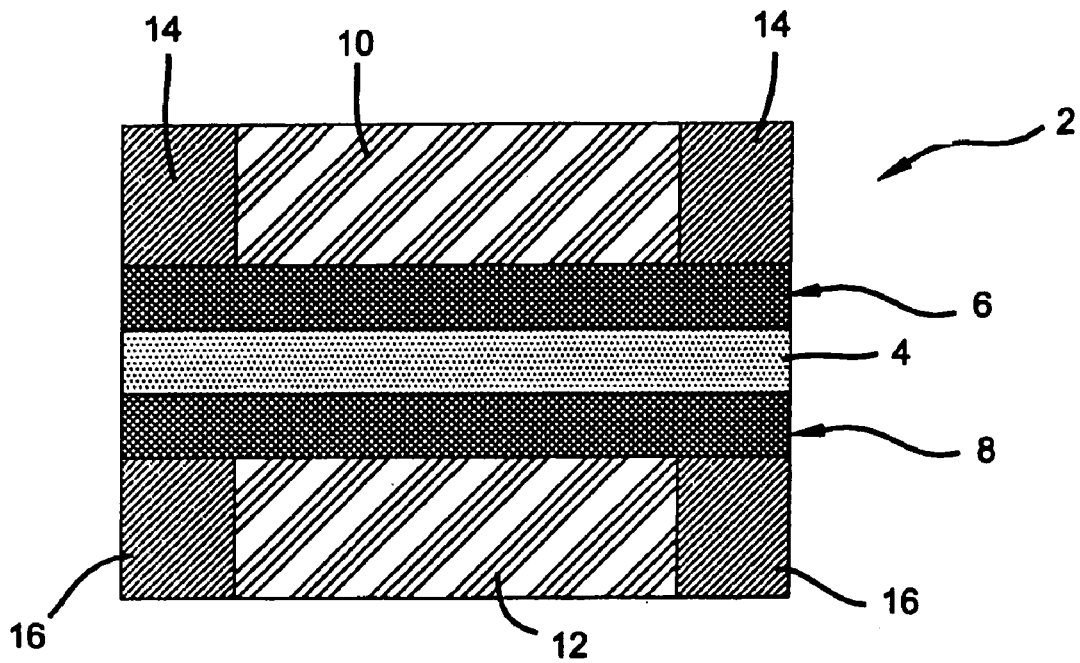
FIG. 1 is a cross-sectional view of a membrane electrode assembly according to a first embodiment of the present invention.

FIG. 1 is a cross-sectional view of a membrane electrode assembly (MEA) according to the present invention. As shown in FIG. 1, the MEA 2 includes an ionically conductive member 4 sandwiched by an anode electrode 6 and a cathode electrode 8. The MEA 2 is further sandwiched by a pair of electrically conductive members 10 and 12, or gas diffusion media 10 and 12. The gas diffusion media 10 and 12 are peripherally surrounded by frame-shaped gaskets 14 and 16. Gaskets 14 and 16 and diffusion media 10 and 12 may or may not be laminated to the ionically conductive member 4 and/or the electrodes 6 and 8.

The ionically conductive member 4 is preferably a solid polymer membrane electrolyte, and preferably a PEM. Member 4 is also referred to herein as a membrane. Preferably, the ionically conductive member 4 has a thickness in the range of about 10 μm-100 μm, and most preferably a thickness of about 25 μm. Polymers suitable for such membrane electrolytes are well known in the art and are described in U.S. Pat. Nos. 5,272,017 and 3,134,697 and elsewhere in the patent and non-patent literature. It should be noted, however, that the composition of the ionically conductive member 4 may comprise any of the proton conductive polymers conventionally used in the art. Preferably, perfluorinated sulfonic acid polymers such as NAFION® are used. Furthermore, the polymer may be the sole constituent of the membrane, contain mechanically supporting fibrils of another material, or be interspersed with particles (e.g., with silica, zeolites, or other similar particles). Alternatively, the polymer or ionomer may be carried in the pores of another material.

In the fuel cell of the present invention, the ionically conductive member 4 is a cation permeable, proton conductive membrane, having $H^+$ ions as the mobile ion; the fuel gas is hydrogen (or reformate) and the oxidant is oxygen or air. The overall cell reaction is the oxidation of hydrogen to water and the respective reactions at the anode and cathode are $H_2=2H^++2e^-$ (anode) and $\frac{1}{2} O_2+2H^++2e^-=H_2O$ (cathode).

The composition of the anode electrode 6 and cathode electrode 8 preferably comprises electrochemically active material dispersed in a polymer binder which, like the ionically conductive member 4, is a proton conductive material such as NAFION®. The electrochemically active material preferably comprises catalyst-coated carbon or graphite particles. The anode electrode 6 and cathode electrode 8 will preferably include platinum-ruthenium, platinum, or other Pt/transition-metal-alloys as the catalyst. Although the anode 6 and cathode 8 in the figures are shown to be equal in size, it should be noted that it is not out of the scope of the invention for the anode 6 and cathode 8 to be of different size (i.e., the cathode larger than the anode or vice versa). A preferred thickness of the anode and cathode is in the range of about 2-30 μm, and most preferably about 10 μm.

The gas diffusion media 10 and 12 and gaskets 14 and 16 may be any gas diffusion media or gasket known in the art. Preferably, the gas diffusion media 10 and 12 are carbon papers, carbon cloths, or carbon foams with a thickness of in the range of about 50-300 μm. The gaskets 14 and 16 are typically elastomeric in nature but may also comprise materials such as polyester and PTFE. However, the gaskets 14 and 16 may be any material sufficient for sealing the membrane electrode assembly 2. A preferred thickness of the gaskets 14 and 16 is approximately ½ the thickness of the gas diffusion media 10 and 12 to about 1½ times the thickness of the gas diffusion media 10 and 12.

In accordance with a first embodiment of the invention shown in FIG. 1, the anode electrode 6 and cathode electrode 8 are disposed on opposing surfaces of the ionically conductive member 4 so as to completely cover the ionically conductive member 4. Disposing the electrodes 6 and 8 to completely cover the ionically conductive member 4 provides protection for the ionically conductive member 4 from puncture by the fibers of the porous gas diffusion media 10 and 12. Moreover, disposing the electrodes 6 and 8 to completely cover the ionically conductive member 4 provides mechanical support throughout the entire surface of the ionically conductive member 4.

Before further describing the invention, it is useful to understand the problem herein identified in the prior art design.

Figure 2:
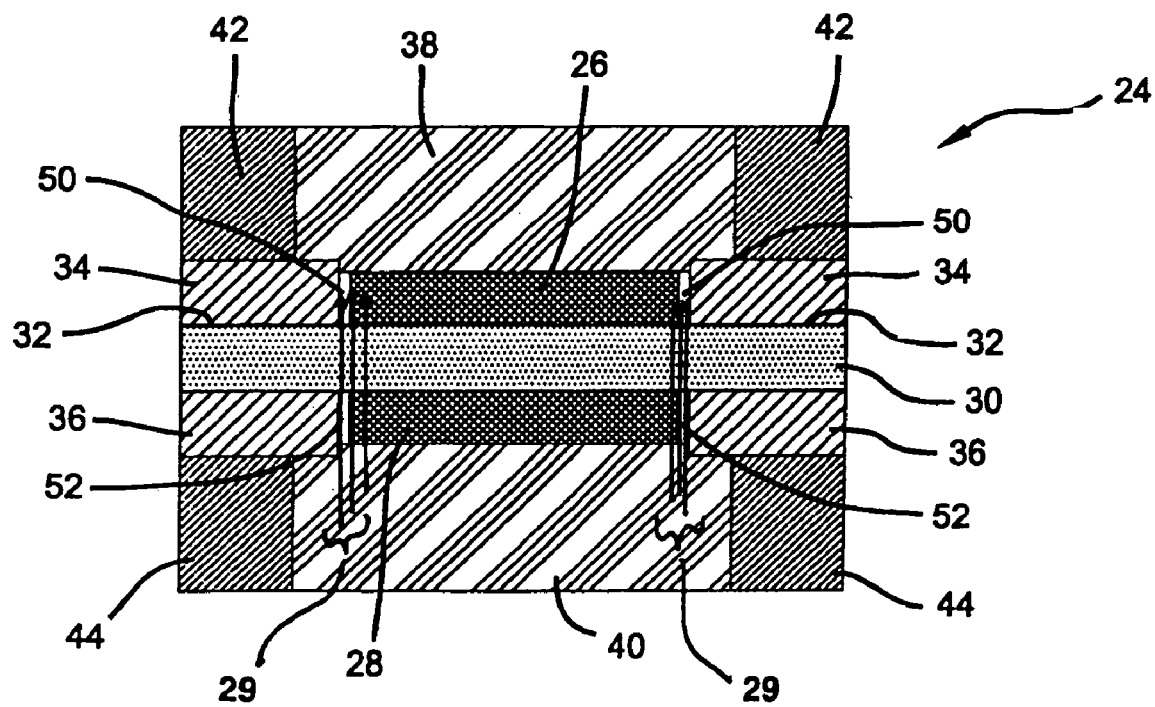
FIG. 2 is a cross-sectional view of a prior art membrane electrode assembly.

The prior art MEA 24, as can be seen in FIG. 2, includes electrodes 26 and 28 with a much smaller surface area in comparison to the membrane electrolyte 30 such that edges 32 of the membrane electrolyte 30 protrude outward from the electrodes 26 and 28. On these edges 32 of the membrane electrolyte 30, rest sub-gaskets 34 and 36, that are disposed to surround the electrodes 26 and 28. Gas diffusion media 38 and 40 sit upon the sub-gaskets 34 and 36. Gaskets 42 and 44 surround the gas diffusion media 38 and 40.

Due to difficulty in manufacturing to tight tolerances, there is a gap 50 between the electrode 26 and sub-gasket 34. A similar gap 52 exists between electrode 28 and sub-gasket 36. Such gaps 50, 52 act as a living hinge, permitting membrane 30 to flex. Such hinge action leads to stress and tears, rips or holes. This also leads to stress as the compressive force acting on membrane 30 differs due to such difference in height. For example, if the sub-gasket 34 or 36 is higher than the electrode 26 or 28, the compressive forces on the subgasket 34 or 36 will be too high, if the sub-gasket 34 or 36 is shorter than the electrode 26 or 28, the compressive forces on the electrode 26 or 28 will be too high. Thus, the arrangement typical in the prior art causes a small gap formed between the sub-gaskets 34 and 36 and the electrodes 26 and 28. This small gap leaves a small portion of the membrane electrolyte 30 unsupported. Furthermore, if the sub-gaskets 34 and 36 are thicker than the electrodes 26 and 28, they form a "step" upon which gas diffusion media 38 and 40, which are typically porous graphite/carbon paper, rest. Gas diffusion media 38 and 40 assist in dispersing reactant gases $H_2$ and $O_2$ over the electrodes 26 and 28 and conduct current from the electrodes 26 and 28 to lands of the electrically conductive bipolar plates (not shown). As such, in order to facilitate electrical conductivity between the gas diffusion media 38 and 40 and electrodes 26 and 28, the membrane electrode assembly 24 needs to be compressed at a high pressure. This puts a great deal of stress on the unsupported portion of the membrane electrolyte 30 which may cause it to develop small pinholes or tears. The pinholes are also caused by the carbon or graphite fibers of the diffusion media 38 and 40 puncturing the membrane electrolyte 30. These pinholes and tears cause the fuel cell to short and produce a lower cell potential.

It should be noted that although sub-gaskets 34 and 36 are depicted in FIG. 2 beneath gaskets 42 and 44, sub-gaskets 34 and 36 are necessarily used. More particularly, only gaskets 42 and 44 may be present, directly disposed on the membrane electrolyte 30. Nevertheless, due to manufacturing tolerances, gaps 50 and 52 may still be present and therefore, the membrane electrolyte. 30 is still unsupported and subjected to undue stress when compressed in a stack.

Accordingly, uniform mechanical support of the ionically conductive member 4, which is a very delicate material, provided by the present invention is a significant improvement that reduces any potential variations in compressive force on the ionically conductive member 4, thereby reducing the possibility of creep and rupture. Moreover, when a perfluorinated sulfonic acid polymer such as NAFION® is used, linear expansion of the ionically conductive member 4 becomes an issue. More particularly, in the presence of water, perfluorinated sulfonic acid polymers such as NAFION® may have a water intake of up to 50% and a linear expansion that ranges between 15 and 50% (15% if the member 4 is unrestrained, and up to 50% if the member 4 is restrained to movements in only one dimension (the latter is the case for MEAs assembled in a fuel cell stack)). As the overall reaction of the fuel cell produces water as a product, this "swelling" of the ionically conductive member 4 may cause the ionically conductive member 4 to be unsupported around its edges.

When the anode electrode 6 and cathode electrode 8 are disposed to completely cover the entire surface of the ionically conductive member 4, however, this linear expansion is restricted, and therefore, the ionically conductive member 4 remains supported throughout its entire surface. As stated above, the anode electrode 6 and cathode electrode 8 are comprised of catalyst-coated carbon or graphite particles embedded in a polymer binder which, like the ionically conductive member 4, is a proton conductive material such as NAFION®. Although a polymer or ionomer binder such as NAFION® is used, the swelling of the binder does not lead to significant dimensional changes of the electrodes since the ionomer in the electrode can expand into the voids in the electrode (typical void volume fraction of electrodes is 50±25%).

The carbon or graphite particles do not swell in the presence of water, are very porous, and have a high surface area. As the anode 6 and cathode 8 become hydrated in the humid fuel cell, the binder swells and fills the pores between the carbon or graphite. Since the swelling binder fills the pores of the carbon or graphite particles, the linear expansion of the electrodes 6 and 8 is restricted. As such, when the anode electrode 6 and cathode electrode 8 are adhered to the entire surface of the ionically conductive member 4, the linear in-plane expansion of the ionically conductive member 4 is also restricted.

Furthermore, it should be understood that the anode electrode 6 and cathode electrode 8 are disposed over the ionically conductive member 4 as continuous, smooth layers which provides an essentially flat surface for the other elements of the MEA 2 to rest upon. This is beneficial in that when elements such as the diffusion media 10 and 12 and gaskets 14 and 16 are compressed along with the MEA 2 in a fuel cell to facilitate and enhance the electrical conductivity of the electrons produced in the electrochemical reaction of the fuel cell, the ionically conductive member 4 will be subjected to uniform pressure throughout its surface. When the ionically conductive member 4 is subjected to uniform pressures throughout its surface, undue stress on the ionically conductive member 4 will be eliminated. As such, the tears and pinholes that may develop and shorten the life of the MEA and inhibit the overall cell potential will also be eliminated.

Although catalyzed carbon or graphite particles dispersed in a proton conductive binder such as NAFION® has been described and is preferable, the essential aspect of the present invention is the subjecting of the ionically conductive member 4 to the same mechanical properties throughout its entire surface. As such, it is not out of the scope of the present invention to substitute different materials in place of the carbon or graphite particles and proton conductive binder. For example, electrically conductive oxides, and particularly electrically conductive metal oxides may be used.

More particularly, particulate matter such as silicon carbide, titanium dioxide, any other ceramics, or any other material that has a sufficient thermal conductivity, preferably equal to or greater than carbon, may be used in place of the carbon or graphite particles. It is also preferable that this particulate matter have a particle size equal to or less than 15 μm, be chemically stable in the fuel cell environment (i.e., an acidic environment, at anodic potentials (0V vs. RHE) in the presence of $H_2$, at cathodic potentials (1.2V vs. RHE) in the presence of air or $O_2$, and traces of fluoride), and have a sufficient thermal conductivity, preferably equal or greater than carbon or graphite particles.

An example of a binder that may be used in place of the proton conductive binder is polybenzimidazole (PBI). Other binders may be suitable as long as they maintain good adhesion with the ionomeric membrane, are chemically stable in the fuel cell environment (i.e., an acidic environment, at anodic potentials (0V vs. RHE) in the presence of $H_2$, at cathodic potentials (1.2V vs. RHE) in the presence of air or $O_2$, and traces of fluoride), thermally stable up to 150° C., and preferably up to 200° C., are preferably castable from solutions, and maintain good retention of their mechanical properties after the casted films endure temperature excursions up to 150° C.

More specifically, the anode electrode 6 and cathode electrode 8 should comprise materials that supply approximately the same tensile strength, non-standard modulus, elongation to break, specific gravity, water uptake, and linear expansion.

Figure 3A:
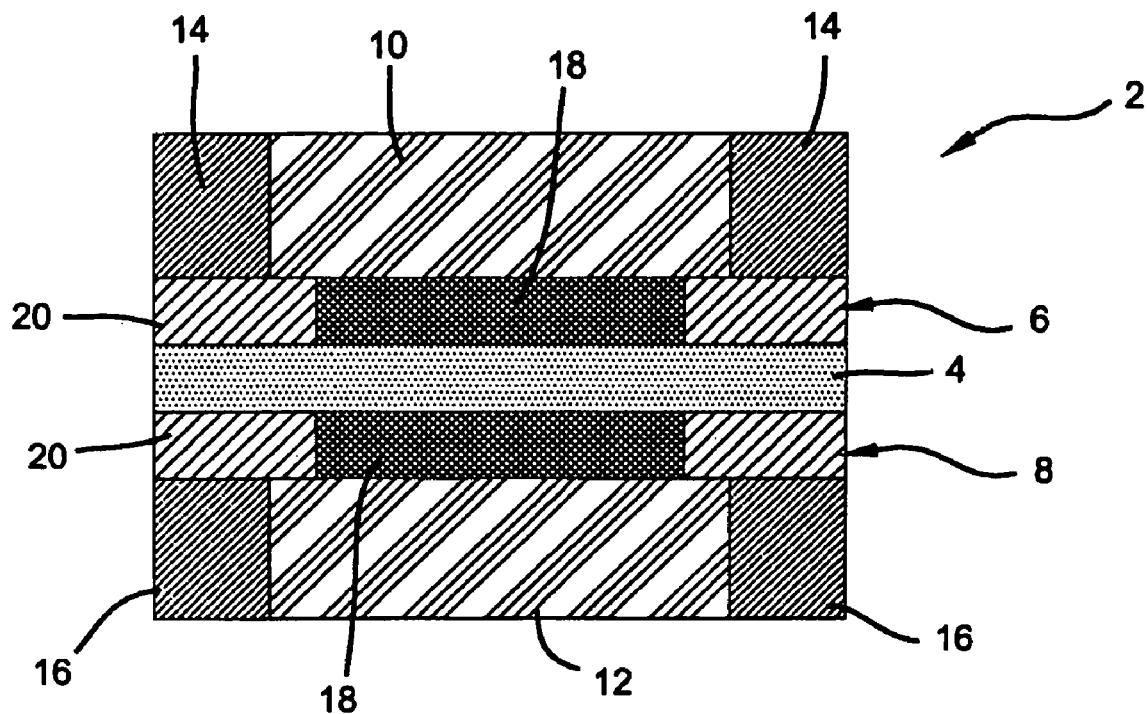
FIG. 3a is a cross-sectional view of a membrane electrode assembly according to a first and second embodiment of the present invention where the anode and cathode electrodes are disposed on an ionically conductive member.
Figure 3B:
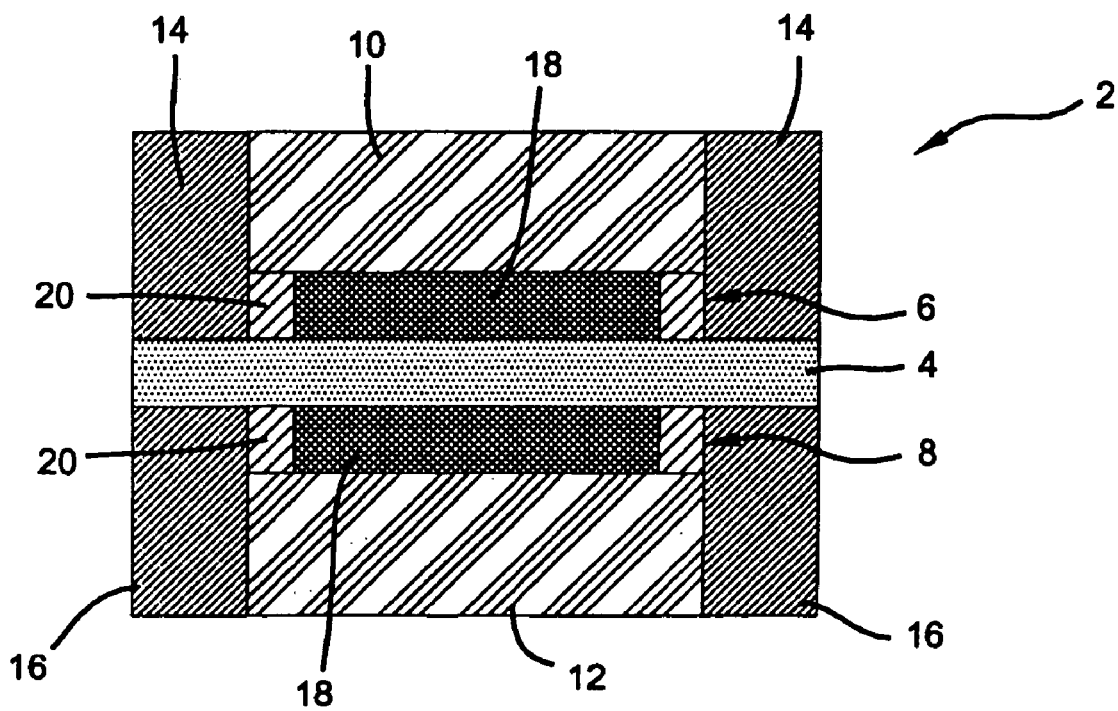
FIG. 3b is a cross-sectional view of a membrane electrode assembly according to a first and second embodiment of the present invention where the anode and cathode electrodes are disposed on gas diffusion media.

In a unique variation of the first embodiment, it may be preferable that the anode electrode 6 and cathode electrode 8 each comprise a central region 18 and a peripheral region 20 as can be seen in FIGS. 3*a*, 3*b*, and 4. The central region 18 comprises a first catalyst content and the peripheral region 20, which frames the central region 18, comprises a second catalyst content, wherein the first catalyst content is greater than the second catalyst content. Specifically, it is desirable that the central region 18 of the anode 6 and cathode 8 comprise a catalyst loading with a catalyst (e.g., Pt) present up to about 0.6 mg/cm$^2$ of the catalytically active phase. More desirably, the catalyst is present in the range of 0.02-0.6 mg/cm$^2$. Most preferably, the catalyst is in the range of about 0.05-0.2 Mg/cm$^2$ of the catalytically active phase. The peripheral region 20 preferably comprises a catalyst loading less than the above described ranges, and more preferably comprises a zero catalyst loading.

There is no limitation to how the anode electrode 6 and cathode electrode 8 are disposed to protect the ionically conductive member 4 and subject the member 4 to uniform mechanical properties. In FIG. 3*a*, the anode electrode 6 and cathode electrode 8 including the central region 18 and peripheral region 20 are coated on the ionically conductive member 4 to completely cover the ionically conductive member 4. The diffusion media 10 and 12 rest upon the anode electrode 6 and the cathode electrode 8. Gaskets 14 and 16 frame the diffusion media 10 and 12 and also rest upon anode electrode 6 and cathode electrode 8 to seal the assembly 2. The gaskets 14 and 16 and diffusion media 10 and 12 may or may not be laminated to the anode electrode 6 and cathode electrode 8.

In contrast, as shown in FIG. 3*b*, the anode electrode 6 and cathode electrode 8 may be coated onto the diffusion media 10 and 12. Gaskets 14 and 16 are now disposed to contact the ionically conductive member 4. The diffusion media 10 and 12 including the anode 6 and cathode 8 may or may not be laminated to the ionically conductive member 4. Furthermore, the gaskets 14 and 16 may or may not be laminated to the diffusion media 10 and 12.

It should be understood that when the anode electrode 6 and cathode electrode 8 are coated onto the membrane 4, the anode electrode 6 and cathode electrode 8 do not necessarily extend to the edges of membrane 4 as shown in FIG. 3*a*. More specifically, the anode electrode 6 and cathode electrode 8 may be coated on the membrane 4 similarly to the configuration shown in FIG. 3*b*, where gaskets 14 and 16 are also disposed to contact the ionically conductive member 4.

It should also be understood that a definitive border between the central region 18 and peripheral region 20 does not necessarily exist as shown in FIGS. 3*a*, 3*b*, and 4. More particularly, it should be understood that essentially a gradient exists between the central region 18 and the peripheral region 20 such that the content of catalyst gradually moves from a greater content in the central region 18 to lesser content in the peripheral region 20. This gradient will exist over the course of, for example, 10 micrometers to 2 millimeters and preferably below 1 millimeter.

It should also be understood that another important aspect of the invention is to avoid a discontinuity of material in the anode 6 electrode and cathode electrode 8. More specifically, the anode electrode 6 and cathode electrode 8 should each exist in this variation as a smooth, continuous layer so that the ionically conductive member 4 faces an electrode layer having essentially uniform mechanical properties throughout its entire surface which will protect the ionically conductive member 4 from stress, over-compression, and puncture. Moreover, MEA processing (such as hot-pressing to decal-transfer electrodes to membrane) to manufacture MEAs by the prior art design could cause weakening of the catalyst edges. This could be due to the property of the ionomeric materials to flow at high temperatures (>90° C.) and high compression, exacerbated by the presence of prominent catalyst edge. Manufacturing an edge-less MEA by introducing a periphery makes this a lesser problem.

Employing an electrode configuration wherein the central region 18 has a catalyst content greater than a catalyst content of the peripheral region 20 provides an advantage in that the expensive catalyst, which preferably comprises metal catalysts such as platinum, palladium, titanium, ruthenium, rhodium, tungsten, iridium, tin, or molybdenum, will not be used in areas where the (electro-)chemical reaction is inhibited or not desired. Such an area is located at the edges of the electrically conductive gas diffusion media 10 and 12.

Another advantage of a design where the catalyst content in the peripheral region 20 is less than the central region 18 is that the generation of heat is suppressed. The electrochemical reaction of hydrogen and oxygen in the fuel cell produces, in addition to water, heat. In a fuel cell, the heat generated by the electrochemical reaction (or by chemical reaction due to either gas permeation through the membrane or gas crossover through pinholes in the membrane) is transferred away by the porous gas diffusion media 10 and 12. However, in the first embodiment of the present invention, the anode and cathode electrodes 6 and 8 extend outward from the gas diffusion media 10 and 12 in order to protect the delicate ionically conductive member 4 from stress and puncture. Although electrochemical reaction rates are largely diminished in regions outside of the diffusion media 10 and 12 (due to poor electronic in-plane conduction in the electrodes), heat is still generated due to the catalyst still being present and exposed to the gaseous reactants. As the gaseous reactants have access to the catalyst, the electrochemical reaction of the fuel cell still progresses in the peripheral region 20 that produces heat; particularly in the case of small membrane pinholes, permeation of either reactant ($H_2$ or $O_2$) will lead to a chemical reaction producing heat. As such, reducing the catalyst content over a gradient between the central region 18 and the peripheral region 20, preferably down to zero, will reduce and suppress the amount of heat generated.

In the variation of the first embodiment comprising the central region 18 and the peripheral region 20, it should be noted that different materials may be used for the central region 18 and the peripheral region 20 as long as the mechanical properties of each region are essentially the same so that a discontinuity in properties is not experienced along the surfaces of the ionically conductive member 4. For example, the central region 18 and peripheral region may comprise different catalyst coated electrically conductive support particles such as carbon, graphite, or electrically conductive oxides, particularly electrically conductive metal oxides. Furthermore, particulate matter such as silicon carbide, titanium dioxide, any other ceramics, or any other material that has a sufficient thermal conductivity, preferably equal to or greater than carbon, may be used in place of the carbon or graphite particles.

In another variation of the above embodiment, in addition to reducing the amount of expensive catalyst utilized and the amount of heat produced, the production of hydrogen peroxide ($H_2O_2$) can be suppressed and eliminated. That is, during the normal operation of a fuel cell, hydrogen and oxygen gas permeate across the ionically conductive member 4 to both anode 6 and cathode 8, respectively, such that oxygen is in the presence of the hydrogen fuel. When these reactant gases comes into contact with the electrochemically active material of the electrodes, the oxygen is reduced and reacts with $H^+$ ions produced from the oxidation of the hydrogen fuel gas. This ensuing side reaction between the reduced oxygen and $H^+$ ions produces $H_2O_2$ as follows:

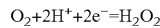

$$O_2 + 2H^+ + 2e^- = H_2O_2$$

This production of $H_2O_2$ has been to known to cause a degradation of the membrane 4 and, thus, a diminished fuel cell life and performance. Referring to FIG. 2, these gases are more prone to permeate the membrane 4 at the edges of the membrane 4 at the so-called gaps 50 between the elements of the fuel cell caused by the manufacturing tolerances described above. As such, a condensed flux 29 of the reactant gases collects at the edges of the electrodes 26 and 28.

Figure 4A:
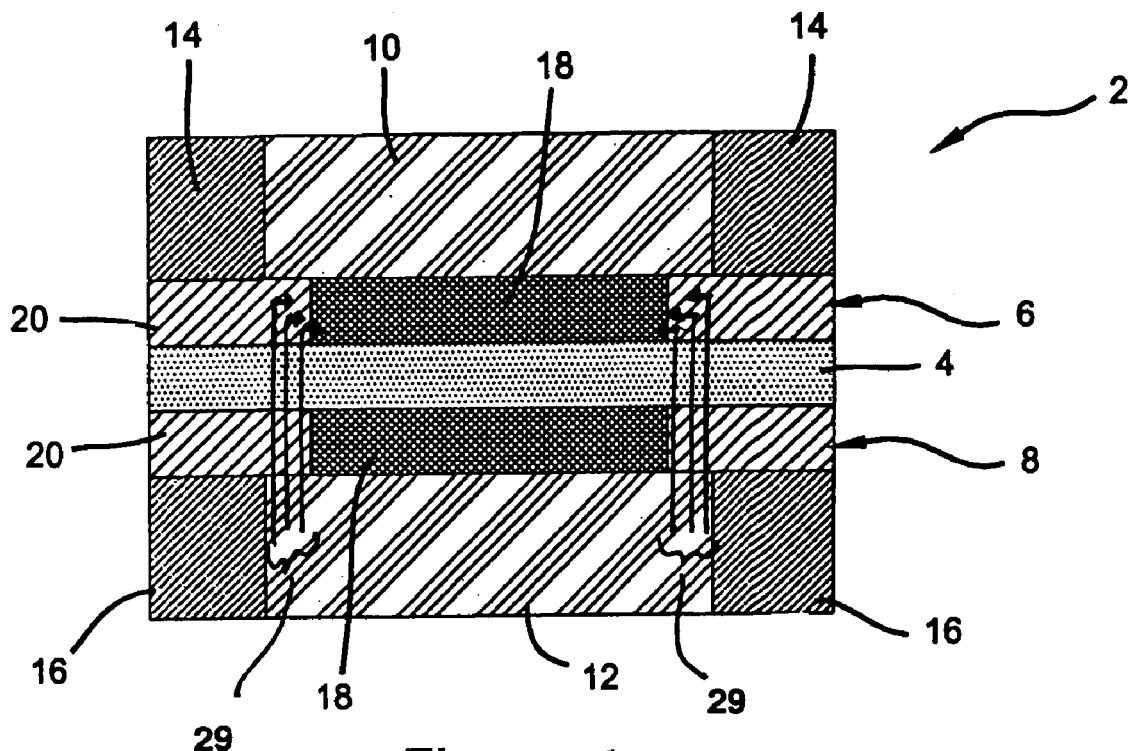
FIG. 4a is a cross-sectional view of a membrane electrode assembly according to a variation of the first embodiment of the present invention where the anode and cathode electrodes are disposed on an ionically conductive member.
Figure 4B:
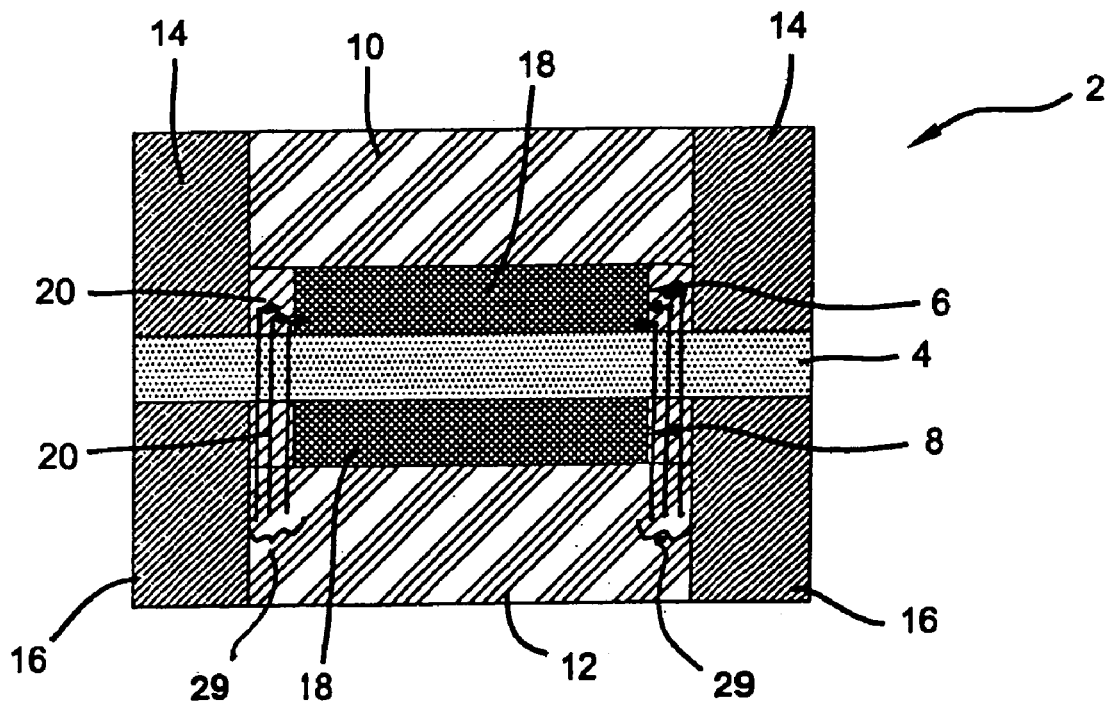
FIG. 4b is a cross-sectional view of a membrane electrode assembly according to a variation of the first embodiment of the present invention where the anode and cathode electrodes are disposed on gas diffusion media.

Now referring to FIGS. 4a and 4b, where the peripheral region 20 surrounds the central region 18, the condensed flux of gases 29 that collects in the peripheral region 20 migrates toward the central region 18. When the condensed flux of oxygen 29 contacts the electrochemically active area, the production of $H_2O_2$ occurs. The degradation of the membrane 4, therefore, typically occurs at the edges of the anode and cathode electrodes 6 and 8, and more particularly, at the edges of the central region 18.

In order to suppress and eliminate the production of $H_2O_2$, the peripheral region 20 of the electrodes 6 and 8 may be formed with an electrically non-conductive support for the electrochemically active material instead of carbon. By using an electrically non-conductive support, the conductive pathway of electrons needed to complete the reaction of oxygen and hydrogen is eliminated. As such, the reaction that produces the $H_2O_2$ cannot occur if the electrochemically active material on the non-conductive support catalyzes the $H_2$ and $O_2$ recombination reaction to $H_2O$. In the case where efficient recombination of $H_2$ and $O_2$ to $H_2O$ is facilitated in the peripheral region 20, $O_2$ which crosses through the membrane in the peripheral region 20 from the cathode side to the anode side will not reach the anode electrode 6, where it otherwise might also react to form other membrane degrading radicals. Analogously, $H_2$ which crosses through the membrane in the peripheral region 20 from the anode side to the cathode side will not reach the cathode electrode 8, where it otherwise might also react to form other membrane degrading radicals. Examples of non-conductive support particles that may be used, but should not be limited to, are zirconium oxide, zeolites, titanium oxide, aluminum oxide, and fumed silica. A preferable electrically non-conductive support is fumed silica sold under the trade name Cabosil sold by Cabot Corporation.

It should be understood, however, that any electrically non-conductive support may be used so long as the mechanical properties are uniform along the membrane surface and can withstand the harsh fuel cell environment. That is, the support particles should be inert to the acidic and high temperature environment. Further, the size of the electrically non-conductive support should be less than 10 micrometer agglomerates of particles, preferably less than 1 micrometer agglomerates of particles, and more preferably less than 0.5 micrometer agglomerates of particles. In this regard, depending on the nature of the material, it should be noted that the particles aggregate to form primary agglomerates of the smaller primary particles. The smaller primary particles should have a particle size of 10-100 nanometers, and preferably a particle size of 20-30 nanometers.

It should also be understood that it is preferable to utilize non-conductive support particles that are catalyzed with a platinum group metal such as platinum, palladium, rhodium, ruthenium, iridium, osmium and alloys thereof. In addition to the above catalysts, any additional catalysts known in the art may be utilized as long as the catalyst is a low temperature hydrogen/oxygen gas phase recombination catalyst. That is, the catalyst should be active towards hydrogen and oxygen at temperatures less than 100° C. and stable in the acidic and humid fuel cell environment. A loading concentration for the catalyst on the electrically non-conductive support particles is present in an amount up to about 20% and preferably in the range of up to 5%. More preferably, the loading for the catalyst is in an amount up to about 1%, and most preferably in the range of 0.1-1.0%.

Moreover, it should be understood that the anode electrode 6 and cathode electrode 8 will still exist as a smooth, continuous layer so that the ionically conductive member 4 faces an electrode layer 6 and 8 having essentially uniform mechanical properties throughout its entire surface which will protect the ionically conductive member 4 from stress, over-compression, and puncture. Further, it should also be understood that the gradient will also exist between the central region 18 and the peripheral region 20 such that the content of catalyst gradually moves from a greater content in the central region 18 to lesser content in the peripheral region 20. This gradient will exist over the course of, for example, 10 micrometers to 2 millimeters and preferably below 1 millimeter.

Yet another solution to this problematic formation of $H_2O_2$ is to use a binder in the peripheral region 20 that is an ionically non-conductive binder. In this manner, the proton conductive pathway is eliminated. An example of such a binder is PBI. Other binders may be suitable and are contemplated as long as they maintain good adhesion with the ionomeric membrane 4, are chemically stable in the fuel cell environment (i.e., an acidic environment, at anodic potentials (0V vs. RHE) in the presence of $H_2$, at cathodic potentials (1.2V vs. RHE) in the presence of air or $O_2$, and traces of fluoride), thermally stable up to 150° C., and preferably up to 200° C., are preferably castable from solutions, and maintain good retention of their mechanical properties after the casted films endure temperature excursions up to 150° C.

Still another solution to the production of $H_2O_2$ is to use both of the above solutions simultaneously. More particularly, it is may be desirable to disperse the electrically non-conductive support particle, with the gas phase recombination catalyst, in the ionically non-conductive binder. In this manner, the conductive pathways for both the electrons and protons needed to complete the reaction to form $H_2O_2$ are eliminated. Moreover, although it is most preferable to modify both the anode and cathode electrodes 6 and 8 according to one of the three above solutions, the present invention should not be limited thereto. That is, either the anode 6 or cathode 8 may be modified singularly to include the electrically non-conductive support, ionically non-conductive binder, or both. Further, it is not out of the scope of the present invention for the cathode electrode 8 to include the electrically non-conductive support and the anode electrode 6 to include the ionically non-conductive binder, or vice-versa.

Figure 5:
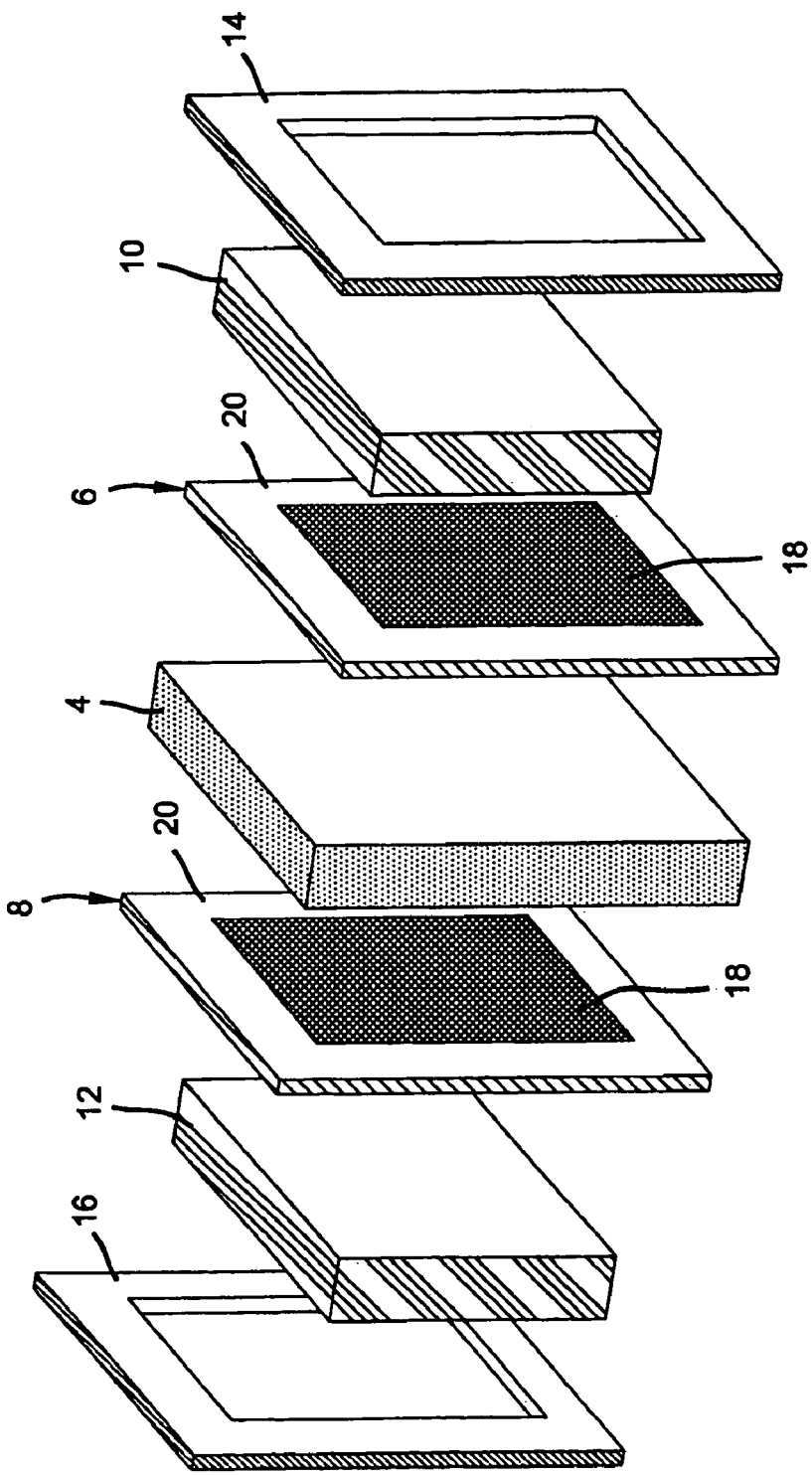
FIG. 5 is an exploded, perspective view of a membrane electrode assembly according to a first and second embodiment of the present invention.

Now referring to FIGS. 3a, 3b, and 5, a second embodiment of the present invention will now be described. As best seen in FIG. 5, and heretofore described above in the first embodiment, the anode electrode 6 and cathode electrode 8 comprise a central region 18 and a peripheral region 20. The central region 18 preferably comprises electrochemically active material, carbon or graphite particles and an ionomer binder. The peripheral region 20 also contains carbon or graphite particles and an ionomer, but in the second embodiment, does not contain any electrochemically or chemically active material.

An electrode configuration wherein the peripheral region 20 contains no electrochemically active material further enhances the thermal conductivity characteristics of the peripheral region 20. As there is no (electro-)chemically active material present in the peripheral region 20 of the second embodiment, there will be no (electro-)chemical reaction in the peripheral region 20. As such, heat will not be generated in the peripheral region 20. The peripheral region 20 will, however, effectively enhance the conduction of heat away from the central region 18 of the electrodes 6 and 8 which will enhance the operation of the fuel cell. In addition to being thermally conductive, the peripheral region 20 of the second embodiment may also be electrically conductive which assists in effectively enhancing the conductivity of electrons produced in the electrochemical reaction of the fuel to improve the overall cell potential.

As was the case in the first embodiment, different materials may be used for the central region 18 and the peripheral region 20 besides carbon or graphite as long as the mechanical properties of each region are essentially the same so that a discontinuity in properties is not experienced along the surfaces of the ionically conductive member 4. More particularly, the central region 18 may also comprise catalyst coated electrically conductive support particles such as electrically conductive oxides, particularly electrically conductive metal oxides or particulate matter such as silicon carbide,. titanium dioxide, any other ceramics, or any other material that has a sufficient thermal conductivity, preferably equal to or greater than carbon.

The peripheral region 20 may also comprise different support particles such as electrically conductive support particles such as electrically conductive oxides, particularly electrically conductive metal oxides or particulate matter such as silicon carbide, titanium dioxide, any other ceramics, or any other material that has a sufficient thermal conductivity, preferably equal to or greater than carbon. It should be noted however, that these particles are not catalyzed.

Furthermore, it is not out of the scope of the present invention to use a polymer binder alone in the peripheral region 20 as long as the mechanical properties remain essentially the same as the central region 18. For example, a polymer binder such as PBI, Kynar, polyester, polyethylene, or any other polymer binder suitable for a fuel cell environment may be used unitarily.

Figure 6A:
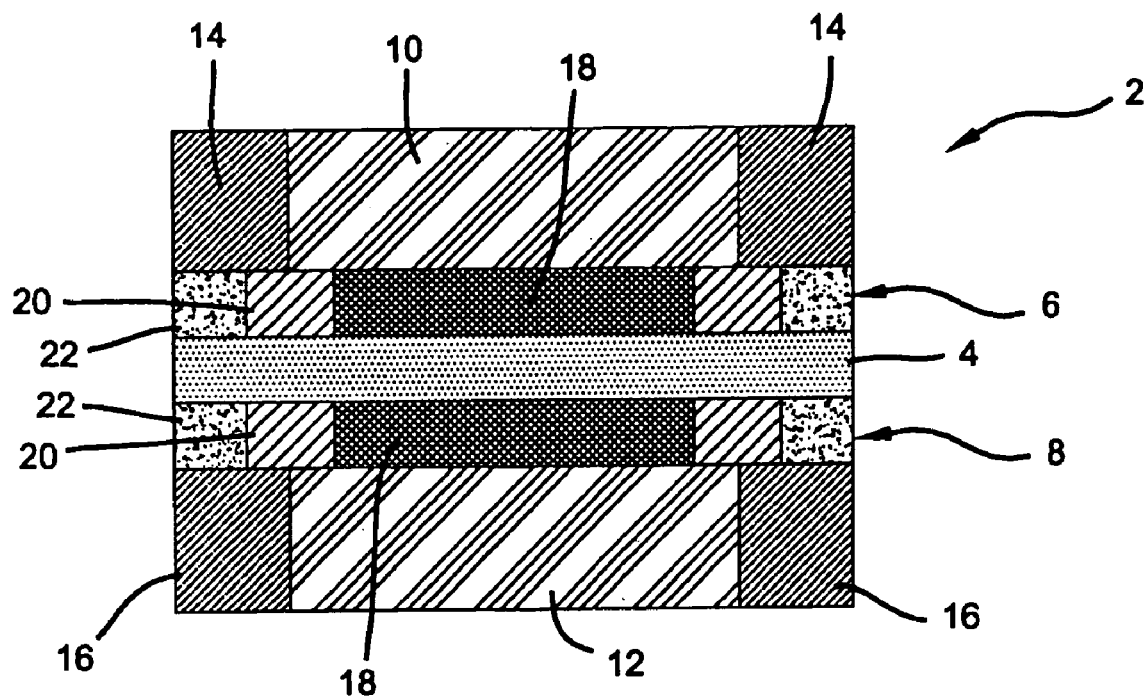
FIG. 6a is a cross-sectional view of a membrane electrode assembly according to a third embodiment of the present invention where the anode and cathode electrodes are disposed on an ionically conductive member.

Now referring to FIGS. 6a and 6b, a third embodiment of the present invention will be described. As in the first and second embodiments, the MEA of the third embodiment preferably comprises a central region 18 of electrochemically active material, carbon or graphite particles, and an ionomer. The peripheral region 20 also preferably comprises electrochemically active material, carbon or graphite particles, and an ionomer. Once more, as stated above in the first and second embodiments, different support particles such as electrically conductive support particles such as electrically conductive oxides, particularly electrically conductive metal oxides or particulate matter such as silicon carbide, titanium dioxide, any other ceramics, or any other material that has a sufficient thermal conductivity, preferably equal to or greater than carbon may be used. Further, the electrically non-conductive support particles may also be used. The MEA of the third embodiment, however, also comprises a sealing region 22 adjacent the peripheral region 20 (shown in FIG. 6a). The sealing region 20 prevents the leakage of the gaseous reactants from the fuel cell, and is comprised of a resin such as polyvinylidene fluoride dispersed among the carbon or graphite particles and ionomer. Polyvinylidene fluoride is a thermoplastic resin sold under the tradename Kynar® by Elf Atochem.

Although the addition of the sealing region 22 prevents the leakage of the gaseous reactants from the fuel cell, the sealing region 22 also provides the benefit of enhancing the mechanical strength and toughness of the edges of the MEA assembly such that the ionically conductive member 4 will be further protected from stress and puncture from the gas diffusion media 10 and 12 when compressed in a fuel cell stack. The anode electrode 6 and cathode electrode 8 each comprise porous carbon or graphite particles as well as ionimeric binder and are characterized by a large void volume fraction (50±25%) which may enable the escape of the reactant gases. The addition of the sealing region 22, comprising the sealing material such as Kynar®, fills or imbibes into these remaining void areas to provide an increased mechanical strength in addition to more effectively sealing the MEA 2 from the lateral escape of the reactant gases.

It should be understood that although Kynar® is preferred, any resin may be used as long as it has a low permeability to gases and liquids and is resistant to most chemicals and solvents. Furthermore, any resin one may choose should be heat resistant to temperatures greater than 150° C., and more preferably greater than 200° C., so that it may withstand the harsh fuel cell environment. An example of such a resin that may be used, but should not be limited to in substitution for Kynar®, is an epoxy resin.

Figure 6B:
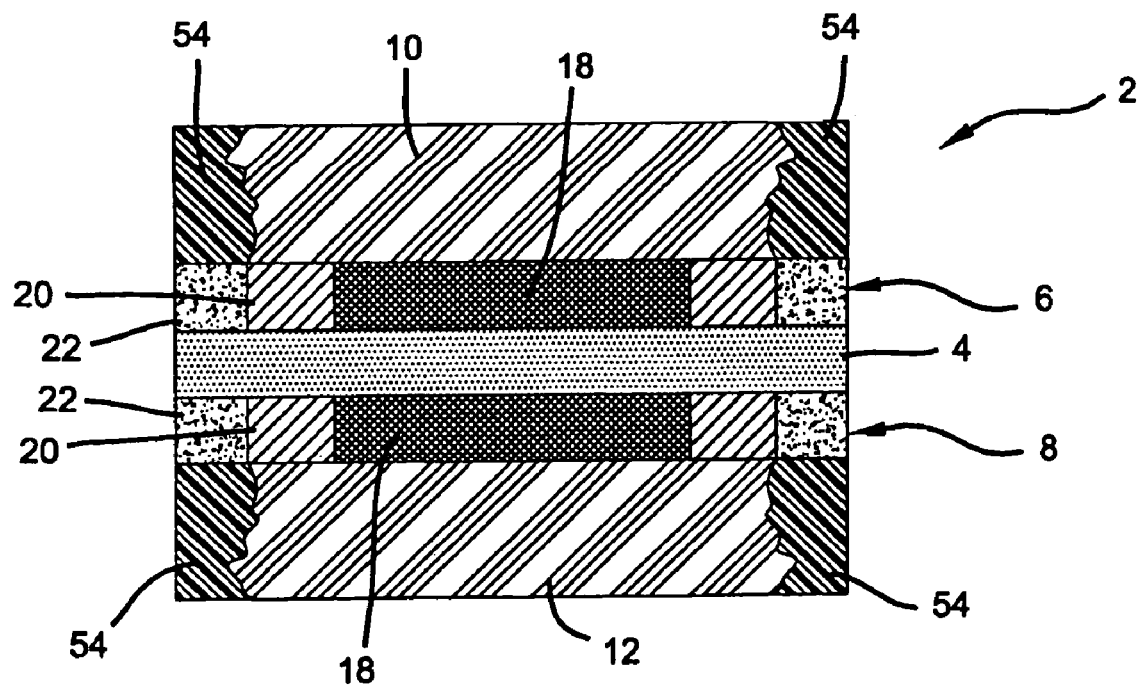
FIG. 6b is a cross-sectional view of a membrane electrode assembly according to a third embodiment of the present invention where a resin may also be used to coat edges of the diffusion media.

Furthermore, as shown in FIG. 6b, the resin may also be used to coat edges of the diffusion media 10 and 12 to form a seal 54. In this manner, the resin also imbibes into the porous diffusion media 10 and 12, similar to the imbibing of the sealing material into the pores of the electrodes, described above. Coating the edges of the diffusion media with the seal 54 can therefore eliminate the use of gaskets 14 and 16. It should be noted, however, that gaskets 14 and 16 may still be utilized in FIG. 6b (although gaskets 14 and 16 are not shown) if desired.

In each of the above embodiments, the central region 18 and peripheral region 20 may be catalyzed with finely divided catalytic particles so that the weight ratio of catalytic particles to carbon or graphite particles of the peripheral region 20 is less than that of the central region 18. It is evident that where the peripheral region 20 does not contain any catalyst particles and the central region 18 is catalyzed, this condition will be met. In the embodiment where catalytic particles are included in both regions, it is preferable that the weight ratio of catalytic particles to carbon particles in the central region 18 is greater than that of the peripheral region 20.

A method of preparing a MEA 2 according to the present invention will now be described. In order to prepare the anode 6 and cathode 8 of the MEA, catalyzed carbon particles are prepared and then combined with the ionomer binder in solution with a casting solvent. Preferably, the anode 6 and cathode 8 comprise ⅓ carbon or graphite, ⅓ ionomer, and ⅓ catalyst. Preferable casting solvents are aqueous or alcoholic in nature, but solvents such as dimethylacetic acid (DMAc) or trifluoroacetic acid (TFA) also may be used.

The casting solution is applied to a sheet suitable for use in a decal method, preferably the sheet is a Teflonated sheet. The sheet is subsequently hot-pressed to an ionically conductive member 4 such as a PEM. The sheet is then peeled from the ionically conductive member 4 and the catalyst coated carbon or graphite remains embedded as a continuous electrode 6 or 8 to completely form the MEA 2.

In order to prepare electrodes 6 and 8 that comprise a central region 18 and a peripheral region 20, two casting solutions may be employed. More particularly, a first casting solution is applied to the sheet suitable for a decal method to form the central region 18 of the electrode 6 or 8. The first casting solution has a predetermined content of catalytic particles contained therein. A second casting solution is then applied to the sheet to peripherally frame the central region 18 as a peripheral region 20. The second casting solution also has a predetermined content of catalytic particles. In accordance with the present invention, the second casting solution has content of catalytic particles less than the first casting solution, or it may contain no catalyst at all. The sheet is then subsequently hot-pressed to a ionically conductive member 4 such as a PEM and then peeled from the ionically conductive member 4 and the central region 18 and peripheral regions 20 remain embedded to completely form the MEA 2. In an alternate embodiment, the electrode is formed on the membrane or on a layer of diffusion media.

The second casting solution is applied directly after the first casting solution has been applied such that the first casting solution has not completely dried or solidified. Applying the casting solutions in such a manner will ensure that smooth, continuous electrodes 6 and 8 will be formed on the ionically conductive member 4 so that there is no discontinuity in the electrodes 6 and 8. Furthermore, applying the casting solutions in such a manner will allow the gradient to form between the central region 18 and the peripheral region 20 of the electrode 6 or 8. In a variation of the above method, it may be preferable to apply the first and second casting solutions essentially simultaneously.

With respect to a method of preparing an MEA according to the third embodiment including the sealing region 22, the present invention should not be limited to a particular method of applying the sealing region 22. For example, the sealing region 22 may be painted or sprayed onto the peripheral region 20 and allowed to fill the remaining void regions. Also, the sealing material 22 may be included in the second casting solution.

A durability experiment comparing an MEA according to the first embodiment of the present invention (FIG. 1) with a prior art MEA (FIG. 2) will now be described. The durability experiment measured the average cell potential over time for both the MEAs according to the first embodiment of the present invention and the prior art MEA.

The durability testing was conducted at high-temperature accelerated conditions ($RH_{anode/cathode}$: 75/50, 200 kpa(g), $T_{stack}$: 95° C.). Each MEA utilized a PEM made from a 25 μm thick membrane with 1100 EW (equivalent weight) membrane (extruded Nafion 111 in the sulfonylfluoride form was purchased from DuPont and ion-exchanged by IonPower, Inc.). These membranes (further referred to as N111) were chosen based on data from prior testing that indicated the N111 membranes were the weakest in terms of durability. As such, if durability were to be achieved by the improved construction of the present invention with a weaker membrane, a more robust membrane would exhibit an even greater likelihood of increased durability.

Figure 7:
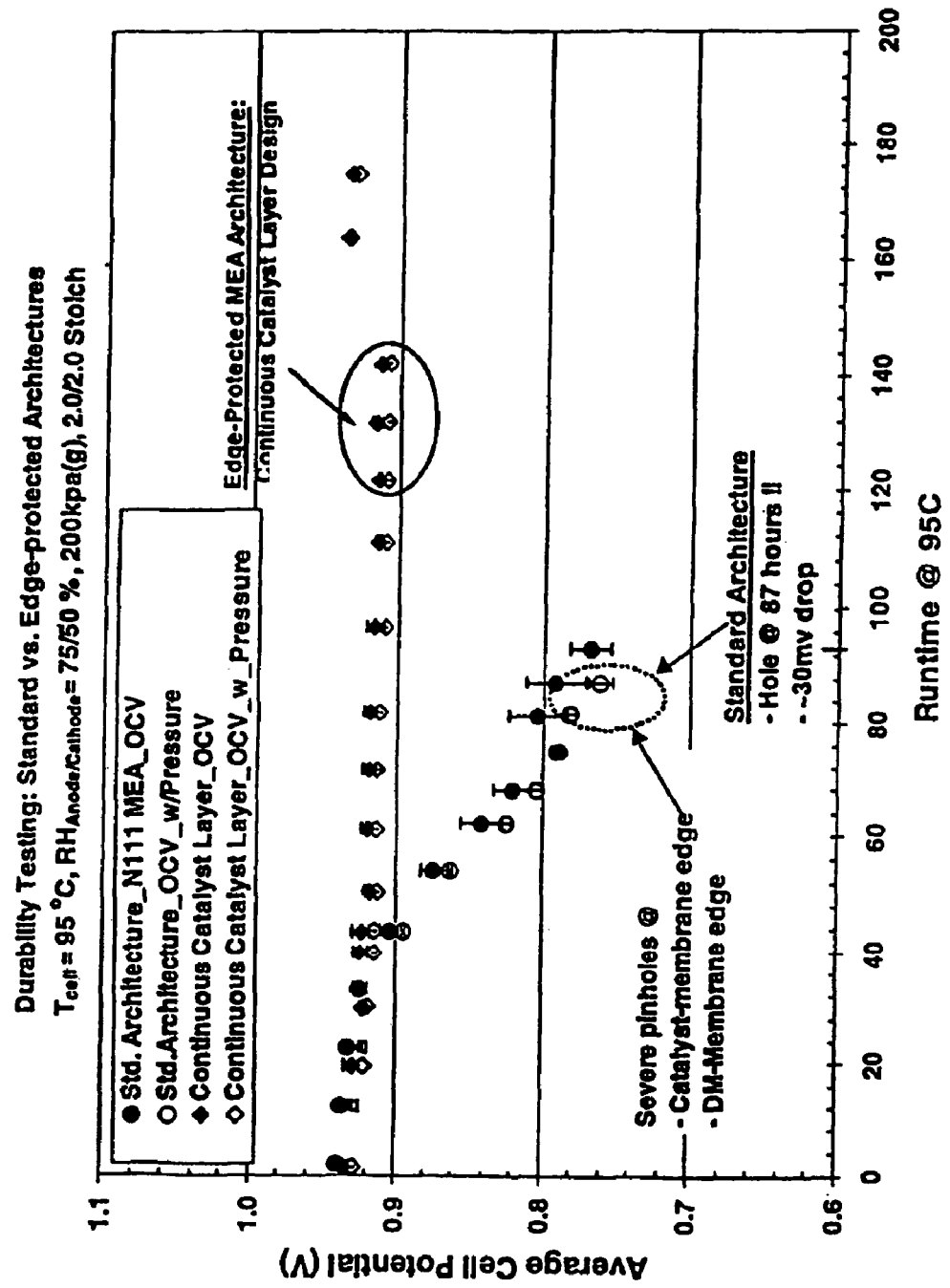
FIG. 7 is a graph of average cell potential versus runtime comparing a prior art MEA with an MEA according to the first embodiment.

Now referring to FIG. 7, it can be seen that the prior art MEA 24 exhibited a lower open circuit cell potential at approximately 45 hours. The drop in the cell potential for the prior art MEA 24 can be attributed to ohmic shorts developing in the MEA 24. These shorts develop when the membrane 30 is punctured by the porous fibers of the gas diffusion media 38 and 40 and by the membrane 30 being stressed due to compression of the MEA 24. At later time (ca. 80 hours), pinholes in the membrane 30 develop, worsening over time and leading to MEA failure.

Comparing open-circuit potentials (OCV) with equal reactant pressures against OCV with anode ($H_2$) pressure higher than cathode (air) provides a valuable insight into pinhole formation. If the OCV with a pressure differential dropped in comparison to OCV with equal pressures, it indicates that there is significant $H_2$ crossover, i.e pinhole formation. As can be seen in FIG. 7, severe pinholes develop in the prior art membrane 30 at approximately 80-90 hours. In contrast, the MEA 2 according to the first embodiment of the present invention exhibits a healthy cell potential up to 175 hours, whereupon gasket failure (puncture of the membrane at the gasket ege) occurred which would not occur in an optimized fuel cell hardware.

Upon completion of the experiment, both the prior art MEA 24 and the MEA 2 according to the first embodiment of the present invention were disassembled. The prior art MEA 24 had severe pinhole damage at the electrode-membrane and diffusion media-membrane edges. The MEA 2 of the first embodiment of the present invention, wherein the electrodes 6 and 8 are extended to cover and support the membrane 4, had no damage evident. Each failure in MEA 2 was only at the gasket edge and would not occur in optimized fuel cell hardware. As such, it is evident that the improved MEA construction of the present invention provides enhanced protection and support of the membrane.

As can be seen, the invention provides a membrane electrode assembly wherein the electrode has a peripheral extent preferably at least as great as the membrane, and preferably is essentially continuous, so as to avoid difficulties with the hinge effect and difficulties with stepwise differences in height, as described herein with regard to FIG. 2. Preferably the electrode of the present invention has a major surface which is at least as great or essentially co-extensive with the major surface of the membrane which it supports. In this arrangement, the electrode functions to minimize flexing of the membrane by avoiding the hinge effect heretofore present on the basis of discontinuity between layers and height differences between layers which would lead to non-uniform compression and compressive creep of the membrane.

The electrode of the invention is conveniently cast by conventional means to form an electrode film. In the electrochemical active regions of the electrode film, catalyst particles catalyze electrochemical reaction between fuel and an oxidant. In peripheral regions of the film adjacent the active area, the catalyst content is less or such peripheral areas are essentially devoid of catalyst. The term catalyst content refers to less catalyst per unit weight of cast film area or less weight ratio of catalyst particles to carbon particles. In either case, the catalyst loading in the active area is relatively high and the catalyst loading in the peripheral, non-active area, is low or essentially zero. Preferably, where the continuous film is formed by application of a first casting solvent, which contains a high catalyst loading, and a second casting solvent which does not contain catalyst, and where the second casting solution is applied before the first casting solution has completely dried to form a film or has not yet cured. Such continuous film of essentially equivalent height throughout is formed and having a gradient of catalyst loading from the active area through the peripheral area. Further, depending on the degree to which the first casting solution has cured before the second casting solution is applied, an interface area may be formed between the active region and the peripheral region, having an intermediate catalyst content which essentially drops to zero at the far edge of the peripheral area.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly for a fuel cell comprising:
   an ionically conductive membrane having a major surface;
   an electrode layer adjacent said major surface and having a peripheral extent corresponding to said major surface, said electrode, including a central region, and a peripheral region; and
   said peripheral region comprising a first binder and a first group of particles;
   wherein at least one of the following conditions applies:
   (i) the peripheral region is electrically non-conductive;
   (ii) the peripheral region is ionically non-conductive.

2. The assembly of claim 1, wherein said central region comprises a second group of particles and a second binder.

3. The assembly of claim 2, wherein said first group of particles and said second group of particles are catalyzed with catalyst.

4. The assembly of claim 2, wherein said second group of particles are catalyzed carbon particles.

5. The assembly of claim 1, wherein said first group of particles are selected from the group consisting of zirconium oxide, zeolites, titanium oxide, aluminum oxide, and fumed silica.

6. The assembly of claim 2, wherein said first and second binder are the same.

7. The assembly of claim 2, wherein said first group of particles and said second group of particles each have a particle size equal to or less than 15 μm.

8. The assembly of claim 3, wherein said catalyst of said first and second group differ.

9. The assembly of claim 3, wherein said catalyst of said first and second group are the same.

10. The assembly of claim 3, wherein said catalyst is selected from the group consisting of platinum, palladium, titanium, ruthenium, rhodium, tungsten, tin, molybdenum, iridium, osmium and alloys thereof.

11. The assembly of claim 1, wherein said central region and said peripheral region each provide substantially similar mechanical support to the ionically conductive member, thereby minimizing flexing of said membrane.

12. The assembly of claim 1, further comprising an electrically conductive member adjacent to said electrode layer.

13. The assembly of claim 12, wherein said electrically conductive member comprises gas diffusion medium.

14. The assembly of claim 13, wherein said gas diffusion medium is selected from the group consisting of carbon cloth, carbon foam, and carbon paper.

15. The assembly of claim 13, wherein said electrode is formed on said gas diffusion medium.

16. The assembly of claim 1, wherein said electrode layer is formed on said major surface of said ionically conductive membrane.

17. The assembly of claim 1, wherein said peripheral region is thermally conductive.

18. The assembly of claim 1, wherein said electrode layer is in the form of a continuous layer, and said peripheral region encompasses said central region.

19. The assembly of claim 12, wherein said peripheral region minimizes contact between said electrically conductive member and said membrane.

20. The assembly of claim 1, wherein said peripheral region is electrically non-conductive.

21. The assembly of claim 2, wherein said membrane comprises a polymeric ionomer which is the same as said first and second binder.

22. The assembly of claim 1, wherein said peripheral region is ionically non-conductive.

23. The assembly of claim 1, wherein condition (i) applies.

24. The assembly of claim 1, wherein condition (ii) applies.

25. The assembly of claim 1, wherein both conditions (i) and (ii) apply.

26. The assembly of claim 1, wherein said central region is carried on said membrane.

27. The assembly of claim 1, wherein said peripheral region is carried on said membrane.

28. The assembly of claim 12, wherein said central region is carried on said electrically conductive member.

29. The assembly of claim 12, wherein said peripheral region is carried on said electrically conductive member.

30. The assembly of claim 1, wherein said central region is catalyzed with catalyst.

31. A membrane electrode assembly comprising:
    an ionically conductive membrane having a major surface; and
    an electrode at said major surface, said electrode defining a substantially continuous layer supporting said membrane and comprising a central region and a peripheral region;
    wherein a gradient of electrochemically active material exists between said central region and said peripheral region such that a content of said electrochemically active material is greater in said central region than said peripheral region; and
    said central region including a first group of particles that are electrically conductive, and said peripheral region including a second group of particles that are electrically non-conductive.

32. The membrane electrode assembly of claim 31, wherein said electrode layer restricts movement of said membrane.

33. The membrane electrode assembly of claim 31, wherein said electrode layer further comprises a sealing region outboard of said peripheral region, wherein said central, peripheral and sealing regions collectively form said continuous layer and provide continuous, consistent mechanical support to the membrane, thereby minimizing flexing of said membrane.

34. The membrane electrode assembly of claim 31, further comprising an electrically conductive member adjacent said electrode layer, wherein said electrode is formed on said electrically conductive member.

35. The membrane electrode assembly of claim 31, wherein said electrode layer is formed on said ionically conductive membrane.

36. An assembly for a fuel cell comprising:
    a proton exchange membrane with a first surface and a second surface;
    an anode electrode disposed at said first surface;
    a cathode electrode opposing said anode, and disposed at said second surface;
    gas diffusion media disposed at said anode and cathode, said anode electrode and said cathode electrode each comprising a central region and a peripheral region;
    said central region including an electrochemically active material supported on a plurality of electrically conductive particles; and
    said peripheral region including the electrochemically active material supported on a plurality of electrically non-conductive particles, and a sealing material; and
    wherein said anode and said cathode are each in the form of continuous layers that support said proton exchange membrane, minimize flexing of said membrane, and prevent said gas diffusion media from contacting said proton exchange membrane.

37. The assembly of claim 36, wherein said central region comprises an ionically conductive binder retaining said electrically conductive particles and said active material.

38. The assembly of claim 36, wherein said peripheral region comprises an ionically non-conductive binder retaining said electrode non-conductive particles and said active material.

39. The assembly of claim 36, wherein said peripheral region further comprises thermally conductive material.

40. The assembly of claim 36, wherein said sealing material is a thermoplastic resin.

41. The assembly of claim 39, wherein said thermally conductive material is adjacent to said central region and said sealing material is outboard of said thermally conductive material.

42. An assembly for a fuel cell comprising:
    an ionically conductive membrane having a major surface;
    an electrode layer adjacent said major surface and having a peripheral extent essentially the same as said major surface, said electrode including a central region and a peripheral region;
    an electrically conductive member;
    said central region comprising a first ionically conductive binder and a group of electrically conductive particles, and said peripheral region comprising a second ionically conductive binder and a group of electrically non-conductive particles;
    wherein said first and second ionically conductive binders are the same or different.

43. The assembly of claim 42, wherein said electrode layer is formed on said electrically conductive member.

44. The assembly of claim 43, wherein said electrically conductive material comprises diffusion medium and said electrode layer is found on said diffusion medium.

45. The assembly of claim 42, wherein said electrode layer is formed on said major surface of said ionically conductive membrane.

46. An assembly for a fuel cell comprising:
    an ionically conductive membrane having a major surface;
    an electrode layer adjacent said major surface and having a peripheral extent essentially the same as said major surface, said electrode including a central region and a peripheral region; and
    an electrically conductive member;
    wherein said central region comprises an ionically conductive binder and a first group of electrically conductive particles and said peripheral region comprises an ionically non-conductive binder and a second group of electrically conductive particles.

47. The assembly of claim 46, wherein said electrode layer is formed on said electrically conductive member.

48. The assembly of claim 47, wherein said electrically conductive material comprises diffusion medium and said electrode layer is found on said diffusion medium.

49. The assembly of claim 46, wherein said electrode layer is formed on said major surface of said ionically conductive membrane.

50. An assembly for a fuel cell comprising:
an ionically conductive membrane having a major surface;
an electrode layer adjacent said major surface and having a peripheral extent essentially the same as said major surface, said electrode including a central region and a peripheral region; and
an electrically conductive member adjacent said electrode;
wherein said central region comprises an ionically conductive binder and a group of electrically conductive particles and said peripheral region comprises an ionically non-conductive binder and a group of electrically non-conductive particles.

51. The assembly of claim 50, wherein said electrode layer is formed on said electrically conductive member.

52. The assembly of claim 51, wherein said electrically conductive material comprises diffusion medium and said electrode layer is found on said diffusion medium.

53. The assembly of claim 50, wherein said electrode layer is formed on said major surface of said ionically conductive membrane.

54. The assembly of claim 36, wherein the sealing material is imbibed into the peripheral region.

55. The membrane electrode assembly of claim 34, wherein said electrically conductive member further comprises a sealing material imbibed into said electrically conductive member at peripheral edges thereof.

56. An assembly for a fuel cell comprising:
an ionically conductive membrane having a major surface;
an electrode layer adjacent said major surface and having a peripheral extent corresponding to said major surface, said electrode layer, including a central region, and a peripheral region;
said central region comprising a binder and a first group of particles and said peripheral region comprising a binder and a second group of particles;
wherein said first group of particles is catalyzed, and said second group of particles is uncatalyzed or has a catalyst content less than the catalyst content of said first group of particles; and
wherein at least one of said central region and said peripheral region of said electrode layer is carried on said major surface of said membrane.

57. The assembly of claim 56, wherein both said central region and said peripheral region are carried on said membrane.

58. The assembly of claim 1,
wherein a gradient of electrochemically active material exists between said central region and said peripheral region such that a content of said electrochemically active material is greater in said central region than said peripheral region; and
wherein at least one of said central region and said peripheral region of said electrode layer is carried on said major surface of said membrane.

59. The assembly of claim 58, wherein both said central region and said peripheral region are carried on said membrane.

60. An assembly for a fuel cell comprising:
an ionically conductive membrane having a major surface;
an electrically conductive member;
an electrode layer between said membrane and said member, said electrode layer having a peripheral extent corresponding to said major surface, said electrode, including a central region, and a peripheral region;
said central region comprising a binder and a first group of particles and said peripheral region comprising a binder and a second group of particles;
wherein said first group of particles is catalyzed, and said second group of particles is uncatalyzed or has a catalyst content less than the catalyst content of said first group of particles; and
wherein at least one of said central region and said peripheral region of said electrode layer is carried on said electrically conductive member.

61. The assembly of claim 60, wherein said electrically conductive member comprises diffusion medium and both said central region and said peripheral region of said electrode layer are carried on said diffusion medium.

62. The assembly of claim 1, further comprising:
an electrically conductive member;
wherein a gradient of electrochemically active material exists between said central region and said peripheral region such that a content of said electrochemically active material is greater in said central region than said peripheral region; and
wherein at least one of said central region and said peripheral region of said electrode layer is carried on said electrically conductive member.

63. The assembly of claim 62, wherein said electrically conductive member comprises diffusion medium and both said central region and said peripheral region of said electrode layer are carried on said diffusion medium.

64. The assembly of claim 1, wherein the first group of particles are electrically non-conductive.

65. The assembly of claim 1, wherein the first binder is ionically non-conductive.

* * * * *